(12) United States Patent
Swanbufg et al.

(10) Patent No.: US 8,237,664 B2
(45) Date of Patent: Aug. 7, 2012

(54) APPLICATION ADAPTIVE MOBILE TERMINAL

(75) Inventors: Scott Allen Swanbufg, Duluth, GA (US); Mark Wuthnow, Austin, TX (US); Roger Mahler, Atlanta, GA (US); Megan Klenzak, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 699 days.

(21) Appl. No.: 11/634,224

(22) Filed: Dec. 6, 2006

(65) Prior Publication Data

US 2007/0139372 A1    Jun. 21, 2007

Related U.S. Application Data

(60) Provisional application No. 60/751,210, filed on Dec. 19, 2005.

(51) Int. Cl.
*G09G 5/00* (2006.01)

(52) U.S. Cl. ........ 345/173; 345/156; 345/157; 701/400; 701/408; 701/409; 715/856; 715/810; 715/781; 715/864

(58) Field of Classification Search .................. 345/173, 345/156–169, 854, 685, 790, 857, 863, 8, 345/115, 123; 701/400, 408, 409, 410, 411; 178/18.01, 18.05, 18.06; 715/856, 864, 810, 715/781

See application file for complete search history.

(56) References Cited

U.S. PATENT DOCUMENTS

| | | | | |
|---|---|---|---|---|
| 5,657,049 | A * | 8/1997 | Ludolph et al. | 715/856 |
| 6,400,376 | B1 * | 6/2002 | Singh et al. | 345/685 |
| 7,075,512 | B1 * | 7/2006 | Fabre et al. | 345/156 |
| 2004/0145574 | A1 | 7/2004 | Xin et al. | |
| 2004/0155908 | A1 * | 8/2004 | Wagner | 345/854 |
| 2004/0196259 | A1 * | 10/2004 | Bradski | 345/158 |
| 2005/0102329 | A1 * | 5/2005 | Jiang et al. | 707/204 |
| 2006/0033724 | A1 * | 2/2006 | Chaudhri et al. | 345/173 |
| 2006/0238517 | A1 * | 10/2006 | King et al. | 345/173 |

* cited by examiner

*Primary Examiner* — Lun-Yi Lao
*Assistant Examiner* — Olga Merkoulova
(74) *Attorney, Agent, or Firm* — Moazzam & Associates, LLC

(57) ABSTRACT

A user interface is presented for mobile devices that provides for efficient and logical movement between applications on the mobile device. Multiple applications may be used simultaneously and interactively. Such uses and data are stored on the device and re-presented to the user at subsequent uses to provide efficiencies in commonly used functions, applications, and contacts.

20 Claims, 6 Drawing Sheets

APPLICATION ADAPTIVE MOBILE TERMINAL

This U.S. Utility patent application claims priority to U.S. Provisional Patent Application Ser. No. 60/751,210, filed Dec. 19, 2005, the content of which is hereby incorporated by reference in its entirety into this disclosure.

BACKGROUND OF THE INVENTION

1. Field of the Invention

The present invention relates to wireless communication. More particularly, the present invention relates to wireless communication devices and services with multi-operational user interfaces.

2. Background of the Invention

Conventional service environments in use today applied to mobile networked devices are typically cumbersome and inefficient. Users have no choice but to learn the functions associated with every application available on the mobile device without regard to their own specific needs or relation to their own specific context. In essence, users have to conform to the limitations and style of the particular mobile device and its pre-set menu of applications. Furthermore, the manner of accessing the various pre-set programs and applications on a particular mobile device are cumbersome and inefficient. "Drill down" menu-driven application interfaces are one such manner, and are archaic and non-intuitive. Users have to sift through multiple level menus to find a particular program or application, and then activate that particular application to perform a desired function. Often times, the process itself required for use or activation of certain applications is the biggest obstacle for a user because of its non-intuitive or cumbersome nature. Thus, a user may not ever access or utilize a particular application on a mobile device solely because that application is difficult to access on that device.

Thus, a need exists in the art of mobile device access user interfaces for creating an efficient, intuitive, and easy to use and understand interface that allows the user to have access to one or more applications quickly and simultaneously, as well as toggle between such multiple applications at will with minimal effort.

SUMMARY OF THE INVENTION

The present invention provides in exemplary embodiments a novel user interface environment for allowing the user easy, efficient and intuitive access to multiple applications on a mobile device in a quick and logical manner. This system provides for a simple, easy to use interface, while applying a higher level of intelligence which users can take advantage of without being encumbered by the complexity of the vast amount of information being exchanged. Such a novel user interface changes the way that users access and utilize one or multiple applications on a given mobile device.

In one exemplary embodiment, the present invention is a user interface for a mobile device. The interface includes a virtual template area; an object positioned in a particular spot in the virtual template area; and a screening window that traverses across the virtual template area; wherein when the screening window is positioned on the object in the virtual template area, the object function may be activated.

In another exemplary embodiment, the present invention is a mobile device. The device includes a virtual template area; an object positioned in a particular spot in the virtual template area; and a screening window that traverses across the virtual template area; wherein when the screening window is positioned on the object in the virtual template area, the object function may be activated.

In yet another exemplary embodiment, the present invention is a mobile device. The device includes a handset; a virtual template area on the handset; an object positioned in the virtual template area; and a screening window on the handset that traverses across the virtual template area; wherein when the screening window is positioned on the object in the virtual template area, the object function may be activated by a user of the handset.

In one particular exemplary embodiment, the invention provides a Graphical User Interface (GUI) with a unique look and feel for a multi-tasking multi-applications environment used in mobile networking terminals.

In another exemplary embodiment, the invention provides an intelligent interactive information repository scheme used in mobile devices for the collection of data/information and subsequent user profiling at the device level.

In yet another exemplary embodiment, the invention provides a unique human interface scheme for mobile devices utilizing the combination of virtual space, object oriented operating environment and visually oriented input functions.

In another exemplary embodiment, the invention provides a schema for providing a Service Oriented Architecture (SOA) utilizing service abstraction from the application layer through the GUI to the Signaling protocol, gaining and storing information in the interaction.

DETAILED DESCRIPTION OF THE INVENTION

The present invention provides a more robust, more intelligent and more versatile system for cellular, wireless devices, Wi-Fi and wireline networks than is conventionally available. Through the use of the present invention, a user may operate multiple applications, present on the cellular/wireless device, simultaneously and interactively, regardless of what device is used or what network delivers it. Such ability has not been possible in conventional devices because of the conventional configurations that such devices are made available in and the lack of ability to access and utilize multiple applications. Furthermore, the interactivity of applications, as shown and presented in the present disclosure, is unavailable to the level and capability presented herein.

The present invention departs from traditional User Interfaces (UI) and the associated arcane logic, an environment which has traditionally addressed the needs of the conventional mobile network user and is defined by three basic elements. The Adaptive User Interface (AUI) is the first of these. By expanding the visual plane of the device and creating a simple human interface, the present invention provides mobile devices with much more user friendly properties and can be adapted to the demands of the user. This approach is contrary to current design philosophy which is predicated on a single application use model where the mobile subscriber is given a fixed set of features and functions through a predefined applications set. Each application utilizes its own User Interface and there is no commonality in the structure of the application or its concern for interaction with other applications.

A second element of the present invention that is distinguishable from conventional systems is the interactive approach of modeling applications around the design of an Object Oriented Operating (OOO) environment where objects are created, acted upon and change behavior based upon usage, input and interaction from other objects. This necessitates the common design philosophy of (seemingly) disparate applications in order for the user to dictate usage and not be confined to a predetermined set of rules.

Finally, in order to create a dynamic profile of usage based on patterns of behavior, a mechanism is built to take advantage of input from the user, from outside sources such as applications servers and from other mechanisms such as intelligent signaling protocols such as Session Initiation Protocol (SIP). An Intelligent Information Collection Repository (IICR) on the mobile device is used to enhance this novel methodology.

Figure 1A:
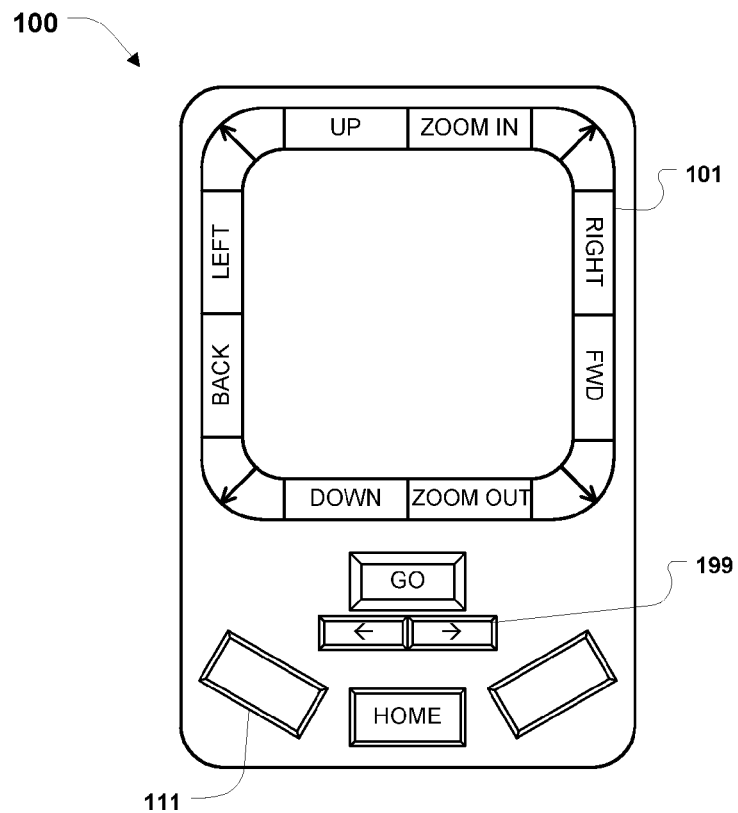
FIGS. 1A and 1B show a device and mechanical user interface according to an exemplary embodiment of the present invention.
Figure 1B:
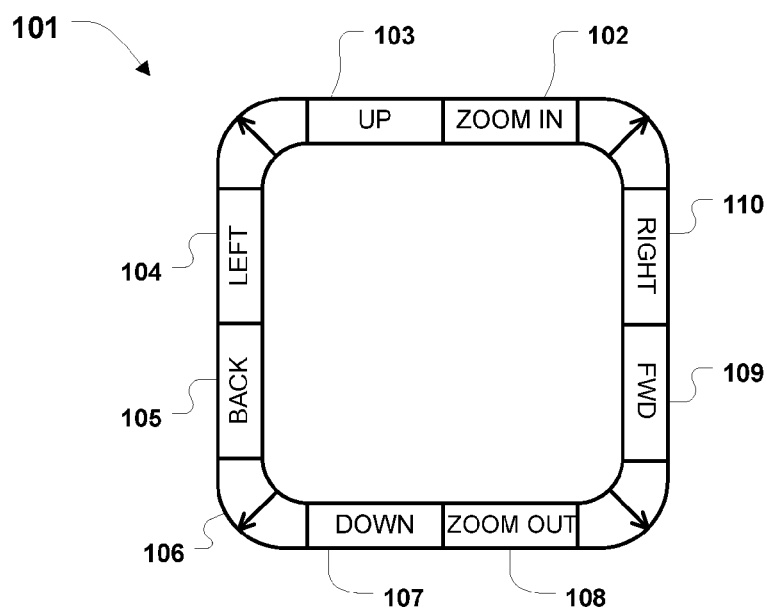

In considering the abilities of the present invention, it's useful to consider examples of exemplary human interfaces that may be used according to the present invention. One such example is device 100 as shown in FIG. 1. The Adaptive User Interface 101 is predicated on the use of an Object Oriented Operating environment. Use of this technology is useful in the development and deployment of an architecture that provides the proper level of consistency and security over mobile networks. The Human Interface is defined by a combination of interactions between the software enabling the objects acted upon and the "mechanical input" 101, 111, 199 from the user at the device. In this case, as represented by FIGS. 1A and 1B, a bezel 101 and button 111, 199 configuration is used as an example of the mechanical input. Other variations of this example may be incorporated. For example, the buttons 102, 103, 104, 105, 106, 107, 108, 109, 100 on the bezel may be positioned elsewhere. Also, other user interfaces may be used, such as a tactile user interface, where the user pushes the screen directly for particular movement or function. Adoption of this principle may also be based on a softkey implementation.

As an example, considering the mechanical bezel 101 more closely, as show in FIG. 1B, a useful aspect of this implementation is a simple user-feedback-response that requires a minimum amount of intervention on the part of the user to access/act upon "objects" (defined in more detail below) or applications. The look and feel consists of the specific elements pertaining to the Virtual Template described in more detail in FIG. 2 and subsequent interfaces with the acted upon objects. The exemplary elements used here include HOME, UP 103, DOWN 107, ZOOM IN 102, ZOOM OUT 108, RIGHT 110, LEFT 104, BACK 105, FORWARD 109, GO, ARROW INPUT 106, SWITCH 199 and HOT KEYS 111 (Pre Load). This look and feel can be further grouped into the following; Movement/Motion Navigation and Action Navigation. The HOME function can be the only exception to this description in that it functions both in Movement/Motion and Action.

The HOME key may be an exemplary human input key that is defined as always either Universal HOME 222 or an Object HOME, as set by the user. State 1 is the condition for Universal HOME 222 as depicted by the virtual template area 200 shown in FIG. 2. After input is received for this state, the view shown is the Universal HOME 222 mode. In State 2, when applied to any object, it is the home (or Initiation) of that object. For instance, when an object 221 defined as an application is launched, it may have a variety of children objects spawned or expose lower level features/functions. Object HOME is not necessarily screen dependent. For instance, a "Map" object could be launched and the related Object HOME could be defined by the starting place on the map. Invoking Object HOME in this case would return the user to the first instance or placement on the map display. In State 2, when input from the Home key is taken, the object will revert back to its original (or Parent) state (see FIG. 9 for a depiction of this environment). Methods other than a physical key may be used as long as the input results function in the way described here.

As used above and throughout this disclosure, an "object" 221 is a software bundle of variables and related methods. Objects 221 are key to understanding object-oriented technology. There are many examples of real-world objects: one's pet, one's desk, one's television set, one's bicycle. These real-world objects share two characteristics: they all have state and behavior. For example, dogs have state (name, color, breed, hungry) and behavior (barking, fetching, and wagging tail). Bicycles have state (current gear, current pedal cadence, two wheels, number of gears) and behavior (braking, accelerating, slowing down, changing gears). Software objects are modeled after real-world objects in that they too have state and behavior. A software object maintains its state in one or more variables. A variable is an item of data named by an identifier. A software object implements its behavior with methods. A method is a function (subroutine) associated with an object (from The Java Tutorial, Sun Microsystems, copyright 1995-2005).

Figure 2:
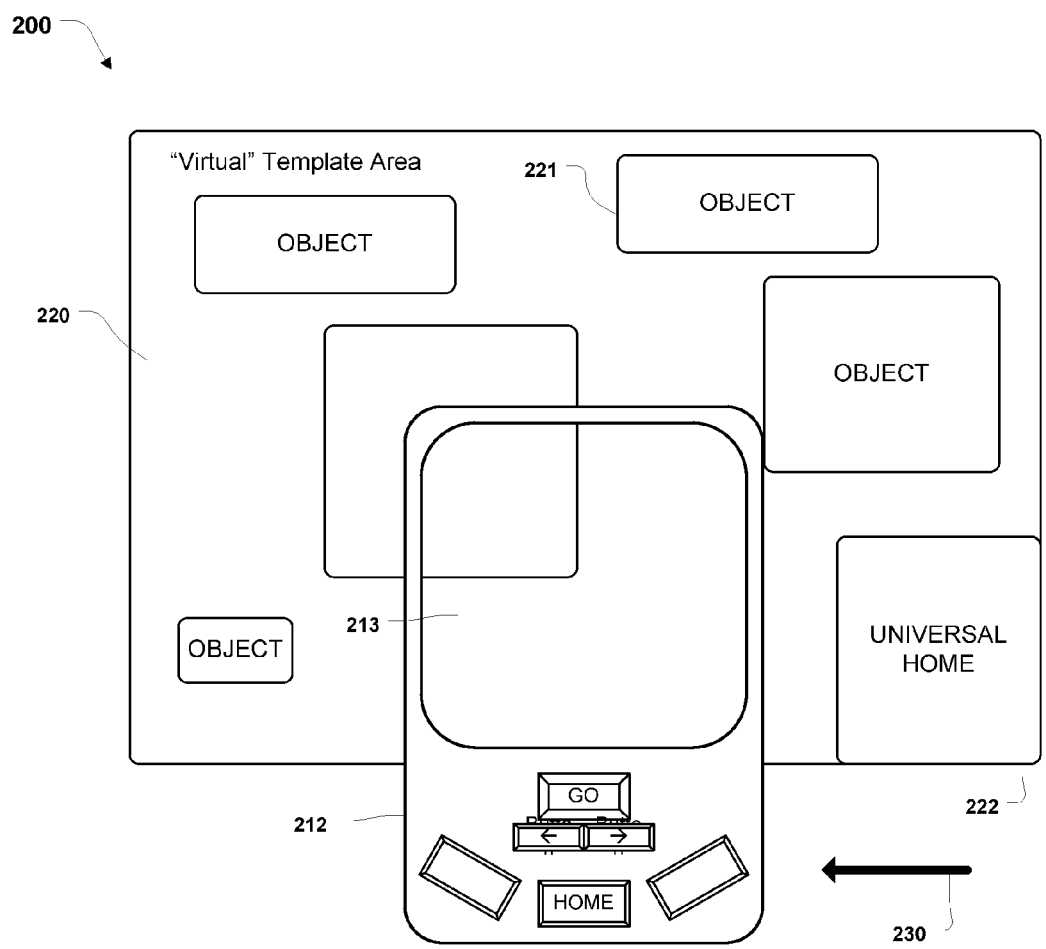
FIG. 2 shows a "Virtual" Template Area according to an exemplary embodiment of the present invention.

As briefly alluded to above, and shown in FIG. 2, a display mapping template 220 may be used to facilitate the movement 230 between objects 221. In order to maximize the volume of object choices available on a mobile device, a virtual space 200 is created to display multiple applications and provide increased visibility and choice once the applications are launched. In FIG. 2, the applications are represented by blocks labeled OBJECT. Reducing the size of the visual imagery to the physical limitations of the device 212 display real estate 213 is not always the optimum solution. This mechanism provides for increased visibility without having to overly modify the original content. The option is still available to limit the total display space of the individual application to the physical display size 213. However, the virtual template area 200 is still available outside of the frame defined by that application. In essence, the Virtual Template Area 200 is an open screen on which multiple applications can reside, be launched and interact with each other. Each object 221 in the defined Virtual Template space can be displayed and acted upon. Universal HOME 222 is the initiation site for start up of the device. Universal HOME 222 is also the reference point to which all operations begin. Objects other than the start up functions may not reside in Universal HOME space.

As shown in the example of FIG. 2, the HOME location 222 is positioned in the lower right hand corner of the Virtual Template Area (VTA) 200 as an example. However, the HOME location 222 is not limited to such position and may be located elsewhere, such as in the center of the VTA 200 to allow for better accessibility to the objects that will be surrounding the HOME area. Also, the user may choose the location of the HOME area depending on the user's desire for the position of particular objects about the HOME.

The initiation of an action to be taken with object/application is predicated on its placement in the device "field of view" (specifically in the HOT SPOT, see FIG. 3 and on for a description and definition) and then performing the appropriate object characteristic (launch, view, message, etc).

Figure 3:
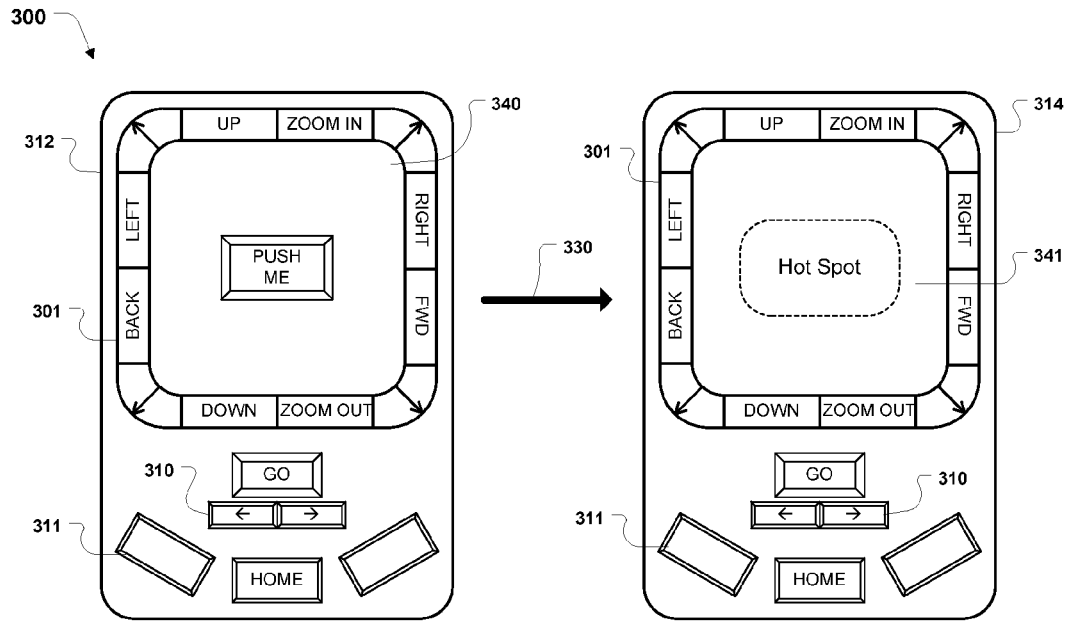
FIG. 3 shows the transition from a Launching Platform to Virtual Template State according to an exemplary embodiment of the present invention.

The Primary State Human Interface will now be described in more detail with respect to FIG. 3. The Adaptive User Interface 300 is defined by a consistent first level "field of view" 340. The first level field of view will consist of the Push Me (virtual) button which launches the originating service architecture and enables the object field to be loaded and accessed. The object field is defined by mapping objects to the virtual template 341 (defined in FIG. 2 and following). This original field of view 340 is known as Universal HOME. Within the center area of the screen a "Hot Spot" is defined. This area is THE launching point of any object. When an object crosses into the Hot Spot zone, it can be acted upon. Highlighting of the object shall be done whenever it is within this area. The user has the option to act on the object by touching it on the screen or using the function GO. Various physical elements 301, 310, 311 of the device as shown before 312 and after 314 movement into a hot spot area are similar to those shown in prior figures and examples.

Figure 4:
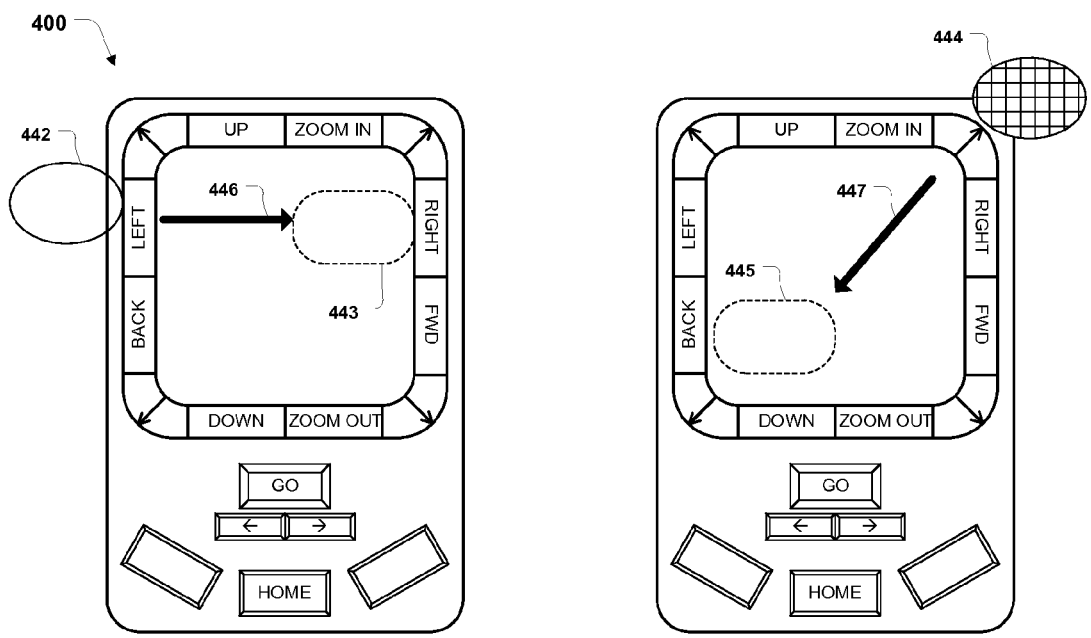
FIG. 4 shows screen movement in virtual space according to an exemplary embodiment of the present invention.

Movement/Motion Navigation (Right/Left, Up/Down, Diagonal) provides for visual modification of an object, as shown in device 400 in FIG. 4. The descriptions of some of these exemplary functions are provided in more detail below.

UP/DOWN: In state 1 this interface function will scroll up or down utilizing the Virtual Template Area (see FIG. 2). In state 2 (after an initial object has been acted upon) the subject of the object can be scrolled up or down.

RIGHT/LEFT: In state 1 this interface function will scroll right or left utilizing the Virtual Template Area (see FIG. 2). In state 2 (after an initial object has been acted upon) the subject of the object can be scrolled right or left.

ARROW Functions: In state 1 this interface function will scroll diagonally utilizing the Virtual Template Area (see FIG. 2). In state 2 (after an initial object has been acted upon) the subject of the object can be scrolled diagonally.

In the examples shown in FIG. 4, a desired object 442 is moved to the right in the direction of the arrow 446 with respect to the physical screen area of the device 400 by movement into space 443. This may be performed by pushing of the right/left arrow as desired. As another example, object 444 may be moved horizontally in a southwest direction indicated by arrow 447 by pushing of the appropriate arrows on the bezel of the device 400. Countless other examples are possible and within the purview of the present invention.

Figure 5:
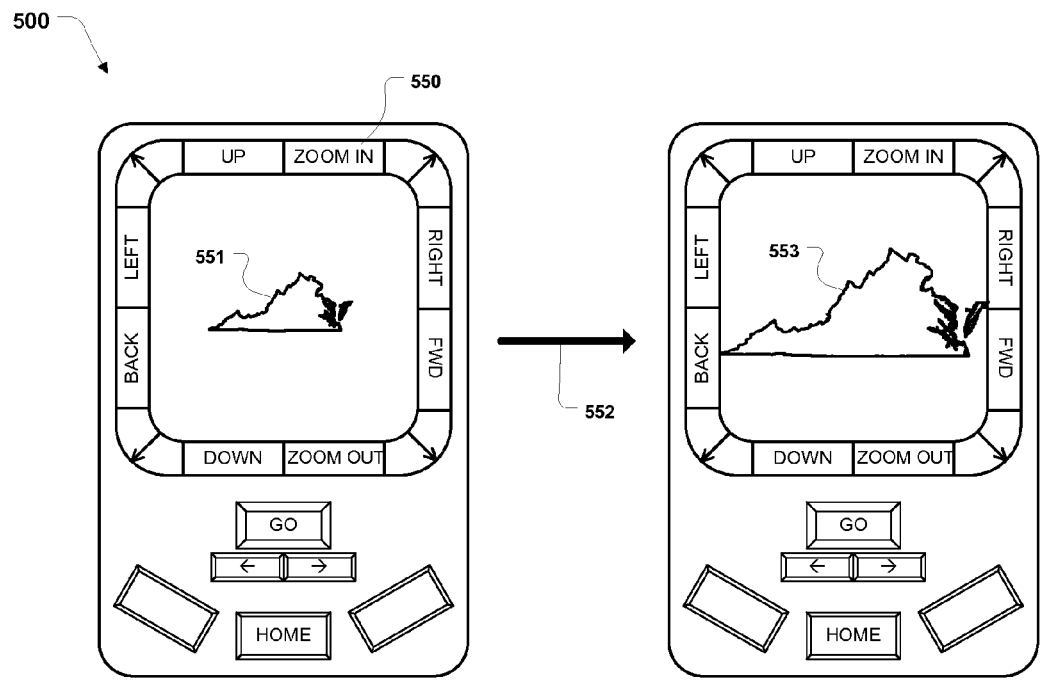
FIG. 5 shows on the fly navigation utilizing a zoom function according to an exemplary embodiment of the present invention.

As shown in FIG. 5, Movement/Motion Navigation (zoom) provides for ZOOM IN/OUT: This interface function provides for magnification of, or zooming away from the object in the field of view. For example, a zoom in button 550 may be placed at the top of the device 500 to enable easy zoom of an object (such as a map) 551 to a second view 552 such that the original object 551 has been enlarged 553 to show more detail. The converse may also be performed.

Figure 6:
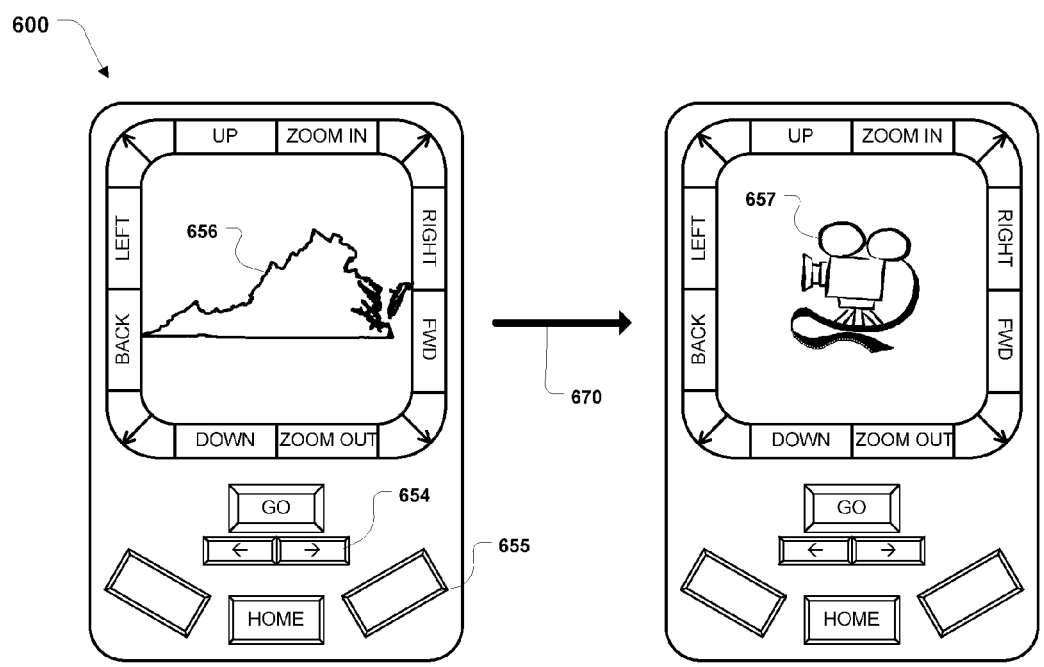
FIG. 6 shows on the fly application to application transition according to an exemplary embodiment of the present invention.

In another example of the abilities of the present invention, and as shown in FIG. 6, Action Navigation, unlike Movement/Motion Navigation, may be used as a controlling function. In this mode, an object 656 within the Hot Spot zone of an equipped device 600 may be instructed to perform a task, change states or interact with another object. The following includes a description of some of these exemplary functions. A non-limiting example may be the instant change 670 of the view of one object 656 (such as a map) to another object 657 (such as a video stream) by the pushing of a button 655 which may be positioned on a lower end of the device 600. Many other non-limiting examples are also possible and within the purview of the present invention. These other examples include, for example, the below functions and abilities.

FWD/BACK: After an object has been acted upon, this function allows for the navigation TO a previously selected object (FWD) or back to the last object acted on or command executed (BACK).

SWITCH: This function allows the user to switch between objects/applications working/running but are not in the current field of view.

GO: When an object is in the Hot Spot (see FIG. 3), the user has the option to act on this object using the GO function.

TOUCH SCREEN: When an object is in the Hot Spot (see FIG. 3) the user has the option to act on this object using the TOUCH SCREEN function. This function may be initiated by a tactile input to the display area.

HOT KEYS: This function allows the user to act upon pre-defined objects that are typically most used. When the function is enabled, a preconfigured object/application is launched. The user has the capability to customize these keys for this purpose.

Figure 7:
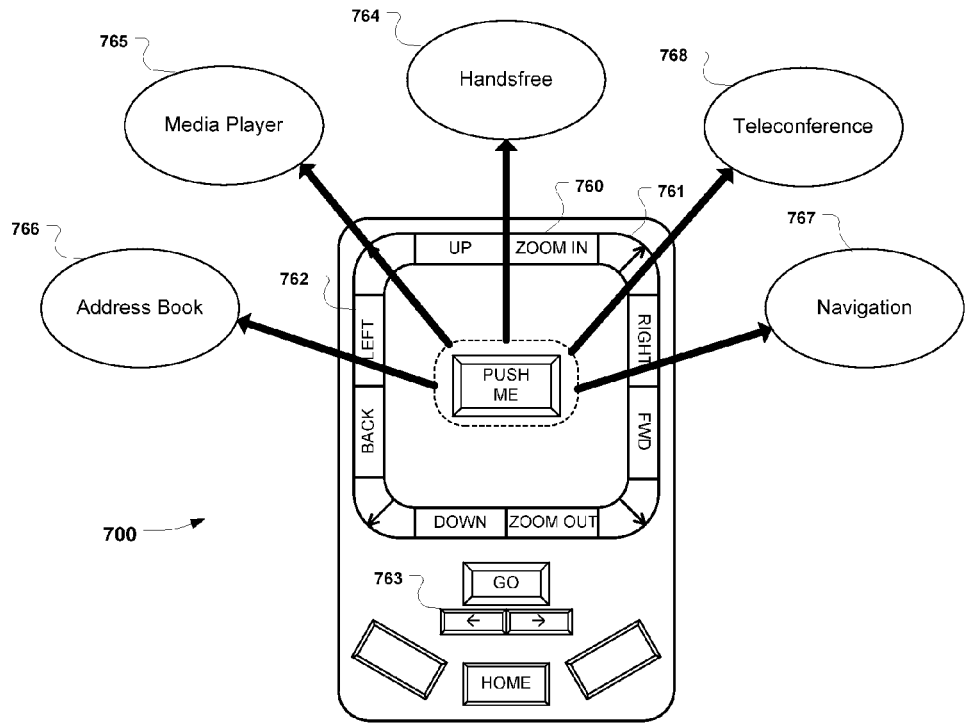
FIG. 7 shows multi-application function according to an exemplary embodiment of the present invention.

As shown by device 700 in FIG. 7, a Multi-Application, Multi Service Environment may be created by combining a variety of the above described functions together, thereby creating a total user experience. The ability to "pop" navigation of objects/applications using various buttons or keys 760, 761, 762, 763 and "pop" between objects/applications 764, 765, 766, 767, 768 allows the user the flexibility to rapidly access and act upon the information/communication desired based on any context/situation or scenario. Utilizing an intelligent interface also narrows the number of objects/applications to a customized user profile, thus creating a higher level of efficiency on the device. This customized profile is discussed in more detail below with respect to Service Interaction and Intelligent Repository Architecture.

Figure 8:
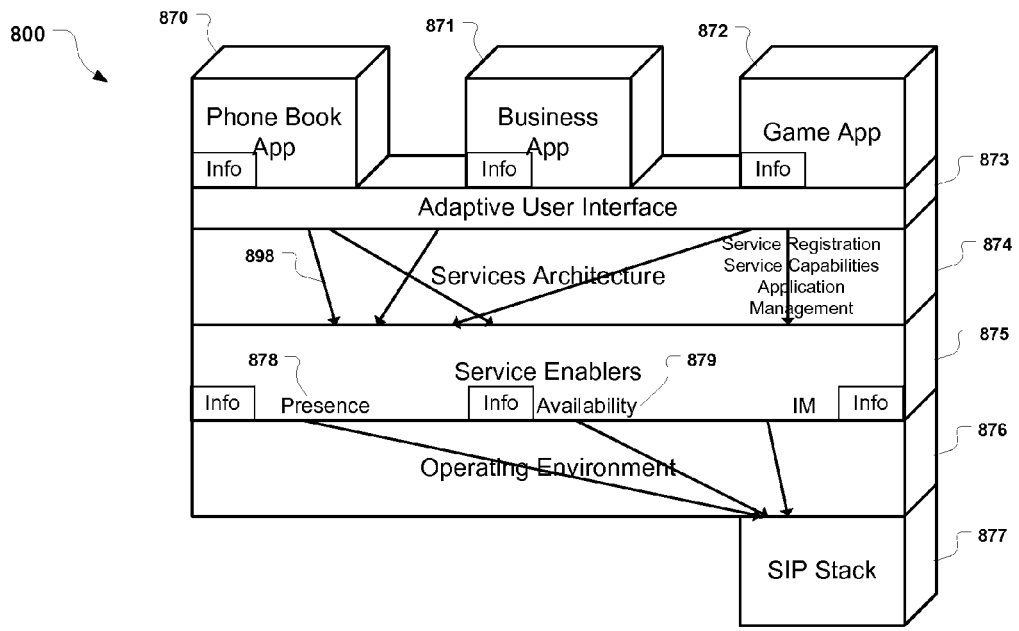
FIG. 8 shows a diagram of a services abstraction framework according to an exemplary embodiment of the present invention.

FIG. 8 shows an exemplary Services Abstraction Framework 800 according to the present invention. As there are a variety of device hardware platforms and device operating systems and environments 876 using basic SIP stack 877, there is a need for a service abstraction architecture layer 874 allowing for objects/applications 870, 871, 872 to operate ubiquitously in the User Experience. This Service Oriented Architecture (SOA) 874 ties 898 the Adaptive User Interface 873 into service enablers 875, 878, 879 for intelligent processing of data. In this example, the service enablers 875, 878, 879 are identified as Presence 878, Availability 879 and Instant Messaging (IM) 875, although any generic service enabler can be used in place of these. The information exchanged through the SOA enables interaction of the vast number of objects/applications available to the device and provides a means to change the objects acted upon. These changes can be in state, behavior or new information development.

Figure 9:
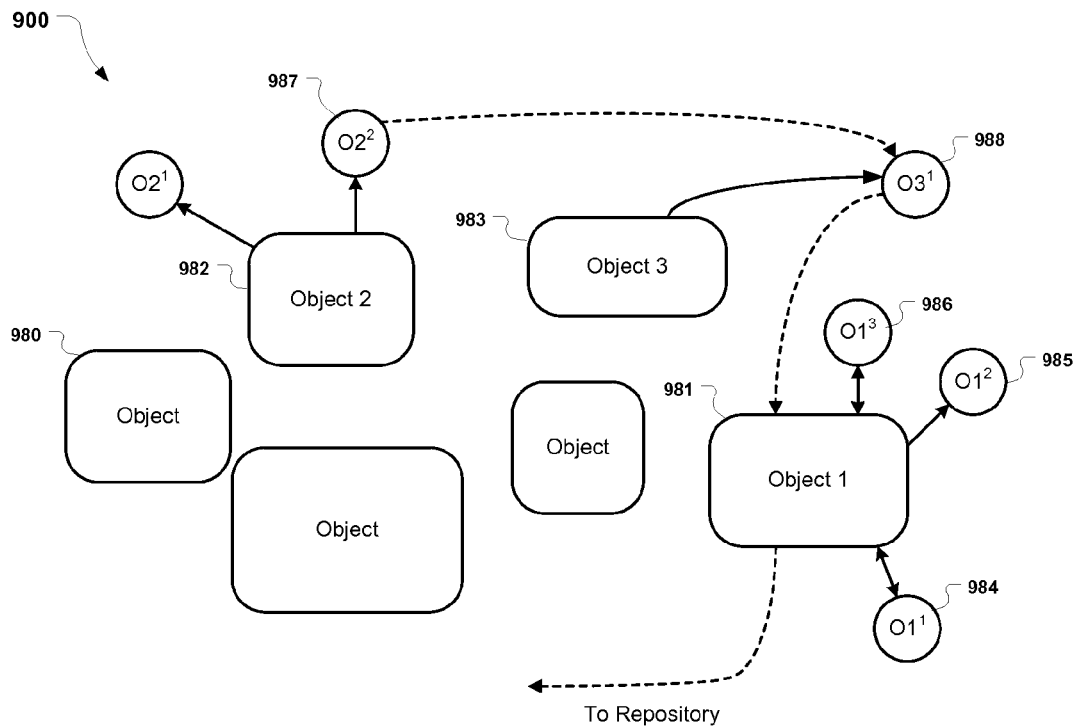
FIG. 9 shows an object/service interaction according to an exemplary embodiment of the present invention.

An example of Object/Service Interaction 900 is shown in FIG. 9. Objects can be applications, data, or other forms of information/communication. Objects can act independently, in conjunction with other objects within their parent-child relationships or with other generically disassociated objects. In this figure, Object 1 981 has spawned children objects $O1^1$-$O1^3$ 984, 985, 986, respectively. Interaction between these objects is linear and thus the information flows only between the corresponding elements (e.g., parent-child, child-parent). The same is true for Object 2 982 in relation to $O2^1$. Note however the difference in the flow for Objects $O2^2$ 987 and $O3^1$ 988. A new level of exchange has taken place with object $O3^1$ 988, between $O2^2$ 987 and Object 3 Parent 983. The resulting action pertains to Object 1 Parent 981. The resultant information exchange from $O2^2$ 987 and $O3^1$ 988 is acted on Object 1 Parent 981. This event results in new information which is collected in Object 1 981 and passed onto an Intelligent Information Collection Repository (see discussion relating to FIG. 10). Objects may be acted upon by agents within the mobile device or from network elements such as the signaling protocol or applications servers also exchanging data/information.

Figure 10:
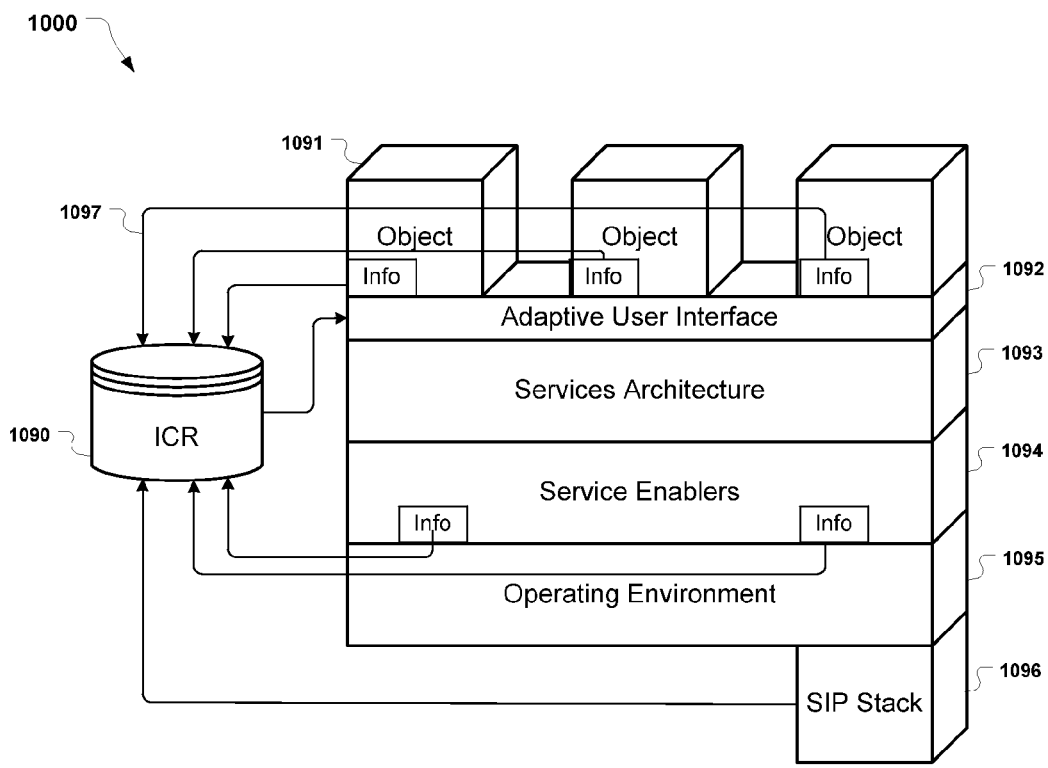
FIG. 10 shows an intelligent repository architecture according to an exemplary embodiment of the present invention.

FIG. 10 shows an exemplary Intelligent Repository Architecture 1000 according to the present invention, with components similar to those shown in FIG. 8. As multiple objects/applications 1091 are acted upon, an Intelligence Information Collection Repository (IICR) 1090 is required at the mobile device. The net result is a user profile that is dynamically stored and fed back to the Adaptive User Interface Virtual Template 1092. These profiles can be visually represented at the Virtual Template Layer, Applications Layer or within the object itself. Dynamic User Profiles (DUP) may be defined by, but not limited to, the following attributes: Type of Service, Most Often Used, Priority of Queuing, Object/Application Dependency (highest interaction between objects), Object Interactivity (Information tags stored as connection pointers from object-to-object), Date/Time of usage, and Enabler Information Tags. Thus, the user's behavior pattern and past use of function and contacts have an impact on the applications that may be presented to the user in future use of the device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A user interface for a mobile device, the user interface comprising:

a virtual template area, the virtual template area including a region defined as a universal home, the universal home including a plurality of start-up objects;

an object positioned in a particular spot in the virtual template area, the object being a software bundle of variables and related methods; and a screening window that traverses across the virtual template area;

wherein upon positioning the screening window on the object in the virtual template area, the object may be activated;

wherein the activated object spawns a second activated child object and communicates usage information to and receives usage information from the second activated child object, the second activated child object interacting with a plurality of child objects, the interaction resulting in new usage information that pertains to the activated object, wherein the new usage information is transmitted to the activated object and stored in a user profile for a user, and wherein the mobile device includes a home key set by the user as an object home for a user-defined starting place on a map object, the home key returning the user to the user-defined starting place on the map object upon being activated.

2. The interface of claim 1, further comprising a plurality of objects positioned at various particular spots in the virtual template area.

3. The interface of claim 2, wherein at least two of the plurality of object functions are activated simultaneously.

4. The interface of claim 1, wherein the mobile device is a cellular telephone.

5. A mobile device, comprising:

a virtual template area, the virtual template area including a region defined as a universal home, the universal home including a plurality of start-up objects;

a home key set by a user as an object home for a user-defined starting place on a map object, the home key returning the user to the user-defined starting place on the map object upon being activated;

an object positioned in a particular spot in the virtual template area; and a screening window that traverses across the virtual template area;

wherein upon positioning the screening window on the object in the virtual template area, the object may be activated;

wherein the activated object spawns a second activated child object and communicates usage information to and receives usage information from the second activated child object, the second activated child object interacting with a plurality of child objects, the interaction resulting in new usage information that pertains to the activated object, and wherein the new usage information is transmitted to the activated object and stored in a user profile for the user.

6. The device of claim 5, further comprising a plurality of objects positioned at various particular spots in the virtual template area.

7. The device of claim 6, wherein at least two of the plurality of object functions are activated simultaneously with the ability to interact with other activated objects.

8. The device of claim 7, further comprising a mechanical input receiver for the user to use to move the screening window over an object.

9. The device of claim 8, wherein the mechanical input receiver includes buttons on a bezel on the mobile device.

10. The device of claim 8, wherein the mechanical input receiver includes tactile buttons on a screen on the mobile device.

11. The device of claim 8, whereas the mechanical input receiver includes a set of software enabled hotkeys.

12. The device of claim 5, further comprising an information repository for collection of data from previous user interactions and re-presentation of the collected data at subsequent interactions.

13. A mobile device, comprising:
- a handset;
- a virtual template area on the handset, the virtual template area including a region defined as a universal home, the universal home including a plurality of start-up objects;
- a home key set by a user as an object home for a user-defined starting place on a map object, the home key returning the user to the user-defined starting place on the map object upon being activated;
- an object positioned in the virtual template area, the object being a software bundle of variables and related methods; and
- a screening window on the handset that traverses across the virtual template area;
- wherein upon positioning the screening window on the object in the virtual template area, the object may be activated by the user;
- wherein the activated object spawns a second activated child object and communicates usage information to and receives usage information from the second activated child object, the second activated child object interacting with a plurality of child objects, the interaction resulting in new usage information that pertains to the activated object, and
- wherein the new usage information is transmitted to the activated object and stored in a user profile for the user of the activated object.

14. The device of claim 13, further comprising a plurality of objects positioned at various particular spots in the virtual template area.

15. The device of claim 14, wherein at least two of the plurality of object functions are activated simultaneously with the ability to interact with other activated objects.

16. The device of claim 15, further comprising a mechanical input receiver for the user to use to move the screening window over an object.

17. The device of claim 16, wherein the mechanical input receiver includes buttons on a bezel on the mobile device.

18. The device of claim 16, wherein the mechanical input receiver includes tactile buttons on a screen on the mobile device.

19. The device of claim 16, whereas the mechanical input receiver includes a set of software enabled hotkeys.

20. The device of claim 13, further comprising an information repository for collection of data from previous user interactions and re-presentation of the collected data at subsequent interactions.

* * * * *

UNITED STATES PATENT AND TRADEMARK OFFICE
CERTIFICATE OF CORRECTION

| | | |
|---|---|---|
| PATENT NO. | : 8,237,664 B2 | Page 1 of 1 |
| APPLICATION NO. | : 11/634224 | |
| DATED | : August 7, 2012 | |
| INVENTOR(S) | : Scott Allen Swanburg et al. | |

It is certified that error appears in the above-identified patent and that said Letters Patent is hereby corrected as shown below:

On the Title page of the patent, at (75), under Inventors, first named inventor's name should read "Scott Allen Swanburg."

Signed and Sealed this
Sixth Day of August, 2013

Teresa Stanek Rea
*Acting Director of the United States Patent and Trademark Office*